(12) United States Patent
Lobb et al.

(10) Patent No.: US 6,699,127 B1
(45) Date of Patent: Mar. 2, 2004

(54) REAL-TIME REPLAY SYSTEM FOR VIDEO GAME

(75) Inventors: Kenneth Lobb, Sammamish, WA (US); Paul Mithra, Moorpark, CA (US); Mike Berro, Moorpark, CA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

(21) Appl. No.: 09/671,316

(22) Filed: Sep. 27, 2000

Related U.S. Application Data
(60) Provisional application No. 60/212,672, filed on Jun. 20, 2000.

(51) Int. Cl.[7] ............................................. A63F 13/00
(52) U.S. Cl. ........................ 463/43; 463/1; 463/7; 463/36; 463/37; 345/418; 345/547; 345/619
(58) Field of Search ........................ 463/43, 44, 45, 463/46, 47, 36, 37, 38, 1, 4, 7, 8, 9; 345/121, 123, 126, 129, 130, 131, 139

(56) References Cited

U.S. PATENT DOCUMENTS

| | | | |
|---|---|---|---|
| 4,342,454 A | * | 8/1982 | Baer et al. .................... 463/31 |
| 4,662,635 A | | 5/1987 | Enokian |
| 4,890,833 A | | 1/1990 | Lantz et al. |
| 4,891,748 A | | 1/1990 | Mann |
| 5,261,820 A | | 11/1993 | Slye et al. |
| 5,267,734 A | | 12/1993 | Stamper et al. |
| 5,273,294 A | | 12/1993 | Amanai |
| 5,364,270 A | | 11/1994 | Aoyama et al. |
| 5,395,242 A | | 3/1995 | Slye et al. |
| 5,408,408 A | | 4/1995 | Marsico, Jr. |
| 5,604,855 A | | 2/1997 | Crawford |
| 5,607,356 A | | 3/1997 | Schwartz |
| 5,737,552 A | | 4/1998 | Lavallee et al. |
| 5,779,548 A | | 7/1998 | Asai et al. |
| 5,782,692 A | | 7/1998 | Stelovsky |
| 5,786,814 A | | 7/1998 | Moran et al. |
| 5,864,346 A | | 1/1999 | Yokoi et al. |
| 5,947,823 A | | 9/1999 | Nimura |
| 5,971,856 A | | 10/1999 | Aoyama et al. |
| 6,183,363 B1 | * | 2/2001 | Ishihara et al. ........... 463/31 X |
| 6,217,446 B1 | * | 4/2001 | Sanbongi et al. ........... 463/7 X |
| 6,280,323 B1 | * | 8/2001 | Yamazaki et al. .......... 463/4 X |

* cited by examiner

Primary Examiner—Teresa Walberg
Assistant Examiner—Binh-An D. Nguyen
(74) Attorney, Agent, or Firm—Nixon & Vanderhye P.C.

(57) ABSTRACT

A system and method for enabling real-time replay for videogames, wherein the player can selectively rewind the videogame to previously played points in the game in order to replay portions of the game during real-time. Inline keyframes are periodically recorded, together with the controller information, so that upon selecting the replay option, the game can be rewound to the nearest keyframe. Once rewound, the game is restored based on the keyframe and is then played back from the keyframe using the stored controller information. At any point during playback, the player can take-over the action and use the actual game controller to begin actual play of the game from that point in the playback sequence. The player can also change cameras and speed for the playback in real-time at any time during the playback.

11 Claims, 16 Drawing Sheets

OVERALL VIDEO GAME SYSTEM c Button Settings

| Standard (Default mode) | Analog Mode | New c Functions | Analog Mode |
|---|---|---|---|
| cU: Spot Cams/follow cams | N/A | cU: Cycle Spot cams + | N/A |
| | | cD: Cycal Spot cams - | N/A |
| | | cL: Cycle Follow cams + | N/A |
| | | cR: Cycle Follow cams - | N/A |
| cD: Positional Cams | A | cU: Field of View | D |
| | | cD Pan Cam (current drop cam) | A |
| | | cL Fixed Cam | B |
| | | cR Zoom Mode | C |
| cL: Positional Follow Camera | B | cU: Set Fixed height camera | B |
| | | cD: Set Fixed direction camera | B |
| | | cL: Set Fixed direction camera | B |
| | | cR: Set Fixed direction camera | B |
| cR: Waypoint Cam Settings | E | cU: Drop camera | E |
| | | cD: Drop camera | E |
| | | cL: Drop camera | E |
| | | cR: Drop camera | E |

FIG. 6

Analog Stick Modes

| Analog Usage | Default after R | A Pan | B Fixed/Pos. Follow | C Zoom | D FoV | E Waypoint |
|---|---|---|---|---|---|---|
| Analog U/D | Playback Speed U/D | Zoom In/Out | Tilt Cam U/D | Zoom from Fixed | FOV +/-, reset on next cam | Move In/Out |
| Analog L/R | Playback Speed U/D | Rotate CW/CCW | Tilt Cam L/R | Rotate CW/CCW | FOV -/+, reset on next cam | Move L/R |
| Z+Analog U/D | N/A | Move Cam U/D | Cam U/D Keep vector | Move Cam U/D | Reset FOV (Z) | Move U/D |
| Z+Analog L/R | N/A | N/A | Cam L/R Keep vector | Move Cam L/R | Reset FOV (Z) | Set Cam Speed on apline in Skater speed +/- |
| A+Analog U or L/D or R | Screw Cam | Screw Cam | Screw Cam | Screw Cam | Screw Cam | Screw Cam |

FIG. 7

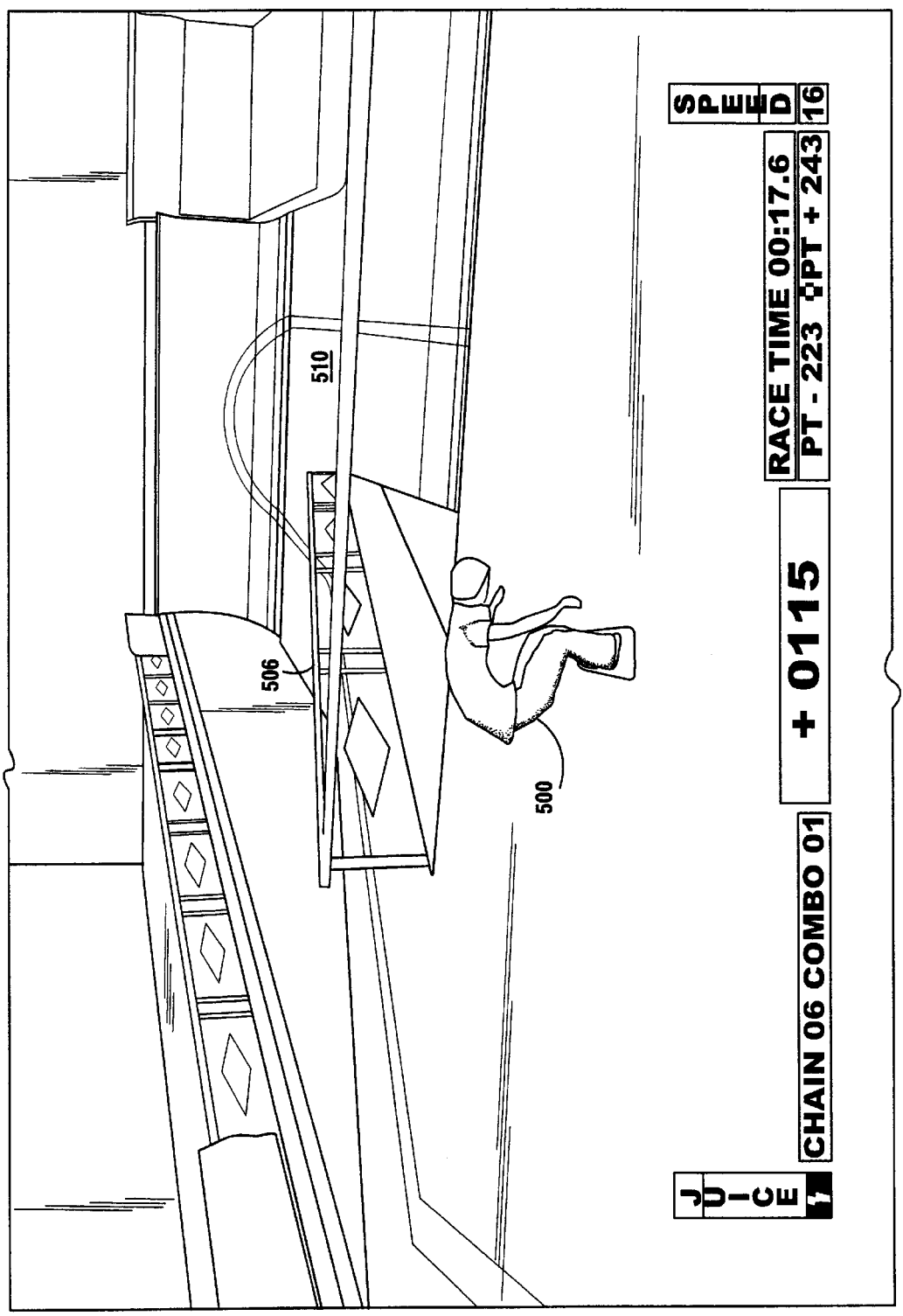

Game Time 1:00 End

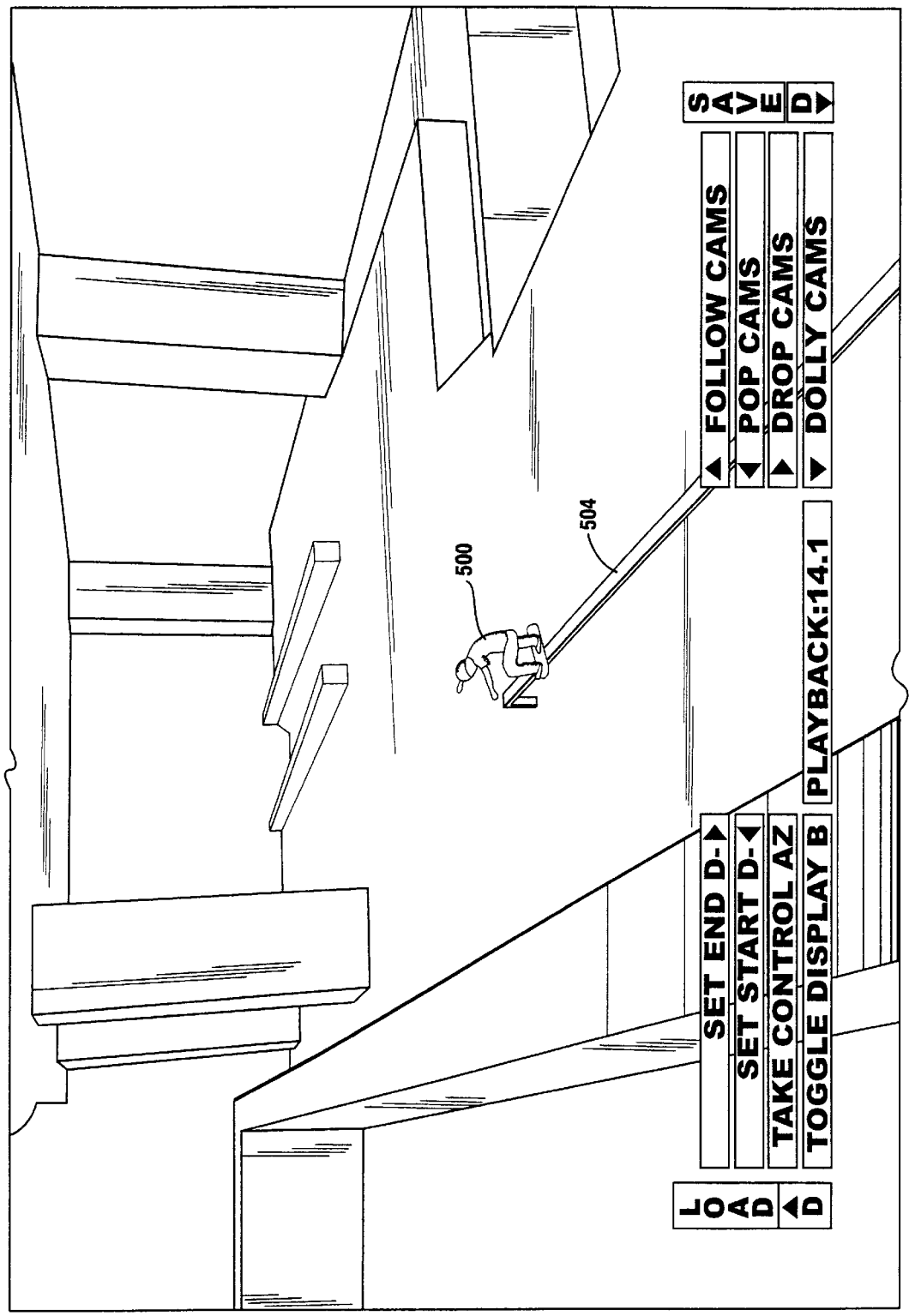

REAL-TIME REPLAY SYSTEM FOR VIDEO GAME

This application claims the benefit of provisional application Ser. No. 60/212,672 filed Jun. 20, 2000.

FIELD OF THE INVENTION

The instant invention is directed to interactive graphics systems, such video games, and more particularly, to an enhanced video game feature which enables real-time replay or rewind during gameplay, as well as the ability to take-over game action while viewing a previously saved gameplay sequence or "video". A further feature of the instant invention relates to improved real-time viewing angle, camera features and speed for video games.

BACKGROUND OF THE INVENTION

Many different types of video games have been provided in the past for the purpose of providing entertainment and enjoyment for video game players. Many of these prior games provide a gameplay environment that enables the player to control a game character or other movable element in the game environment in a manner which enables the player to perform various stunts or moves during the game. Such games are designed to require that the player become skilled at the particular game in order to gain the ability to control the character in a manner which enables difficult stunts or movements to be successfully performed. For example, skateboard games have been provided in the past which enable a player to manipulate a game character (skateboarder) through a gameplay course, such as a simulated street, mall, skate park or other environment, which provides various environmental features, such as rails, ramps, drops, etc., on which the game character can perform various stunts or moves. Other exemplary games require the player to use skill to avoid various hazards while navigating through a game course and/or to out-maneuver or out-run other game characters being controlled automatically by the game program, such as racing games (e.g. autoracing, ski racing, showboard racing, motorcycle racing etc.)

The gameplay goal of many of these and similar games is to maximize the game score achieved during a game or run, by controlling the character in a manner which generates a high score. For example, in skateboard games, the score can be increased by performing particularly difficult stunts (tricks) or series of tricks at various points in the game and by avoiding falling and/or crashing during the game. In other words, such games often provide a number of opportunities during the game for the player to cause the character to attempt a trick, either simply for enjoyment or to increase the game score. For example, the game may provide ten locations or points in the game where a trick or other type of move (depending on the type of game) can be attempted. The game score will increase for each successful trick. In other words, if the player successfully performs tricks at all ten locations in the game, then the score will typically be higher than if the player successfully performs tricks at only eight of the locations but falls or crashes while attempting tricks at the other two locations.

In such games, once a player falls or crashes, he must live with that fact and either continue the game from the crash point or restart the entire game from the beginning (i.e. begin a new game). Thus, once a fall, crash or other undesirable event occurs during a game, that adverse event becomes a permanent part of the game result. As a result, the player only has two options: continue the game from the crash point, knowing that the player's score will never be as good as it could have been without the crash, or quit the present game and start a new game (which requires starting again from the beginning of the game).

Being limited to only these two options upon crashing (or other adverse event), can result in frustration for the player upon the occurrence of an adverse event, thereby reducing the players enjoyment of the game. For example, if a player has performed well for the first fifty seconds of a game, but then suddenly crashes, the player may lose interest in continuing the present game knowing that the score will be adversely effected by the crash. The player may also not want to restart the game from the beginning due to the length of time it will take to make it back to the location of the crash in the previous game. In other words, it can be frustrating for the player to have to start a new game, thereby having to re-perform the same parts of the game that were previously performed successfully in order to reach a corresponding place in the previous game where the adverse event (e.g. crash) occurred. Moreover, even if the player decides to continue the game where the crash occurred, it can be difficult and/or burdensome to reposition the game character in the game environment in such a way that enables the unsuccessful trick to be attempted again. In other words, in some games it is desirable (or even necessary) to perform a particular trick successfully at a particular location in the game prior to moving on to a new aspect of the game. For example, in such a skate game, when a player crashes during a jump, the player must cause the character to push back up a ramp or other structure in order to reposition the character at a place which enables the jump to be re-attempted. This repositioning of the player can waist significant game time and is typically not enjoyable for the player, thereby reducing the overall enjoyment of the game.

Some prior games have enabled a "video" of the game to be saved after completion of the game in order to allow the particular game to be watched again. For example, the autoracing game entitled "Driver" offered by Sony Corporation for the Playstation game console, allows a "video" to be made of the race, so that the resulting video can be watched by the player (or others) immediately after the game or at a later time. In this way, the player can enjoy watching the results of his game or showing the results to others who may not have been present or watching during the actual game. This feature has one benefit of allowing successful game runs to be saved for future viewing and enjoyment. Such prior art games, however, do not enable the player to edit, fix or overwrite adverse events that may have occurred during the game that has been recorded for future playback.

Prior art games have also had various camera or viewing angle features designed to enhance the enjoyment of the game. For example, in Sony Corporation's Driver game, the game allows the video of a previously played game to be viewed from different camera angles at certain points thereof. The Driver game has a "director" feature that can be selected prior to replaying a saved game, wherein this feature enables the game action to be viewed from various predetermined different directions at different predetermined locations for the purpose of making the playback more enjoyable or exciting to watch. For instance, the game may place a panning, dolly or other type of known virtual camera on a particular straightaway on the race course to show the race action from a perspective other than the driver's viewpoint along that straightaway. While the player can select the "director" option for use in the showing the saved game, the game does not allow that player to place or choose cameras during the actual game at desired locations for causing selective real-time changes in the viewing perspectives of the actual game. In other words, prior games, like Sony's Driver game, do not enable real-time placement of cameras or real-time selection of speed for a playback sequence.

In view of the above, there is a need for improved videogames or the like which overcome the deficiencies of such prior art games.

SUMMARY OF THE INVENTION

The instant invention provide improved features for video games of the type discussed above where adverse or undesirable events may occur during gameplay. More particularly, the instant invention provides a real-time replay feature which enables portions of the game to actually be "rewound" or "replayed" in real-time at the option of the player. In other words, in accordance with the invention, the player can, at any point in time during the game, cause the game to be backed-up or rewound in order to, for example, re-attempt a trick, stunt, move or the like that was not successfully performed on the previous attempt during the same game. Thus, the invention provides a method and a system that enables the player to cause the game character (and the game itself) to travel back in game time to a desired point from which the player desires to replay the game. For example, if the player has performed well up to a certain point where he crashes, falls or experiences some other adverse event, the invention enables the player to selectively back-up in the game to a time and place prior to the adverse event and pick-up the action from that time and place for the purpose of attempting to replay that part of the game with a different or better result. In this manner, the player can retry any part in the game in order to, for example, improve his performance during that part of the game, thereby also improving his overall performance and resulting score for that particular game.

In accordance with another aspect of the instant invention, when the player selects the replay option during an actual game, resulting in the game being rewound to a desired point in the game, the game is operable to replay the game using saved controller information from the previous time that that portion of the game was played during the same game, thereby enabling the player to playback and watch any desired portions of the game. In an exemplary embodiment, the game is rewound three seconds each time the replay option is selected, and then the game replays each of the three second portions of the game automatically using the stored controller information. In other words, the player can rewind a portion of the game and simply watch the previous results of that portion of the game or the player can operate the game controller during the playback sequence so as to change the results of that portion of the game. Thus, during playback, the game is selectively controlled by the previously stored controller inputs (thereby not changing the results of the actual game) or based on actual (new) real-time controller inputs from the player during the replay period (thereby changing the result of the actual game).

In accordance with another aspect of the game, the game is recorded as it is being played so that all of the real-time action is saved based on the last time that each portion of the game was played during the game. In other words, if a portion of the game is replayed using the replay option numerous times until the player is satisfied with the result, the video of the game will only include the last replay of that portion. In this manner, the invention enables a seamless video to be generated which shows the entire game from start to finish as if the replay had not been invoked and the player had performed as desired the first time through the game. This feature enables the creation of a "perfect run" including only the desired or successful attempts at each portion of the game course. In other words, by allowing the player to go back in the game and correct any mistakes (such as crashes, falls, missed tricks, or the like) that were made during the game, the player can create a seamless video of the game that looks as if the player made a perfect run with no mistakes.

In addition, by enabling the player to replay any desired portion of the game simply by selecting the replay option, the player can practice any desired trick over and over until the player performs the trick as desired without wasting actual game time and without the need to manually reposition the game character at a location where the trick can be retried. Once the trick is performed properly, the player simply continues through the remainder of the game and the properly performed trick becomes part of the savable and replayable resulting game, as if it had been performed properly the first time.

In accordance with another aspect of the invention, the replay of a previously played portion of a game can be frozen at any point in the replay and changes in the virtual camera's position, behavior (follow, static, dolly, etc.) camera characteristics (zoom, distance, etc.) and/or actual playback speed (fast/slow motion) can be selectively made by the player. These changes are then recorded, in accordance with the invention, together with information that determines on which frame of the playback the change(s) take effect. In this manner, the player can stop and rewind the actual game at any desired point in the game, stop the playback of the rewound portion of the game, and then modify the camera features to be used for that portion of the playback of the game. This enables the player to, for example, selectively show a particularly entertaining or successful trick from a desired perspective, such as a panning, side view, and zooming camera, and to have the selected change in the camera saved as part of the game, so that the next playback of that particular sequence will include the desired changes. Similarly, the speed (i.e. fast/slow motion) of any part of the playback can be changed and saved to further enhance the way in which the playback sequence is shown.

In accordance with another aspect of the invention, once a game is completed and saved, the playback of the saved game can be taken over at any point, so that the player can begin real-time play from any desired point in the playback. This enables saved games to be further enhanced or modified through different and/or improved real-time play of the game at any point in the playback of the saved game. The real-time play introduced into the playback sequence then becomes a part of the saved game, thereby resulting in a new playback sequence.

These and other features of the instant invention are achieved using a playback system that will be described in detail below. In a preferred embodiment of the invention, the playback system uses a combination of "inline keyframe recording", "controller stream recording", and "random keyframe recording." The inline keyframe is a snapshot of the current state of the game universe. In other words, the snap shot or keyframe includes all information on the present state of the game at a particular time during the game. A keyframe is recorded at predetermined times during gameplay. The particular times or frequency at which a keyframe is recorded will generally depend on the amount of usable memory available on the game platform. For example, a keyframe may be recorded every second if eight megabytes of RAM are available or every five seconds if only four megabytes are available. However, any other suitable constant or variable length time periods may be used for recording keyframes. The state of the game controller being operated by the player (i.e. buttons pressed, joystick position, etc.) is recorded every time it is read, such as twenty times per second. A wrapper buffer is used to store each keyframe generated during the game. The size of the wrapper buffer may vary based on the amount of memory available on the particular game machine and/or type of game in which the instant invention is implemented. When the end of the buffer is reached, recording starts over from the beginning of the buffer, thereby overwriting the oldest keyframe (like a tape loop).

To initiate the playback or replay feature of the present invention, the wrapper buffer is "rewound" a predetermined amount of time, such as three seconds, and the nearest keyframe is located. The playback sequence then begins from that keyframe. The "game universe" is then restored from the keyframe, and, as the playback (simulation) progresses, the controller information is read from the buffer memory used previously to store the controller commands. During playback, commands from the real controller are processed independently so as to allow the player to take over the playback at any point during the playback and begin real-time play from that point in the playback.

Preferably, the recording is based on the internal logic rate, and not based on the speed of either the internal processor or the video refresh rate, both of which can vary from console to console. This enables playback at any speed, not necessarily a multiple of the console speed, without loss of synchronization. Thus, the instant invention enables the player to exit playback mode directly into recording mode without disturbing the previous playback sequence, thereby facilitating the creation of long, seamless sequences.

In addition, a system of "random keyframes" is preferably utilized. As explained above, the playback of a sequence can be frozen at any time so that changes to the camera and/or the playback speed can be selectively made. These changes are recorded in an array of "random keyframe buffers", along with information that determines on which frame of playback the changes take effect. This system allows the standard playback keyframes to be much smaller, thereby resulting in the ability to recorded longer sequences.

In accordance with the invention, when a playback sequence is saved to any of the rather limited non-volatile memory systems typically available on game consoles, only the first inline keyframe is saved. Further, when a saved playback sequence is loaded from non-volatile memory for viewing, a flag is set which causes the game software to begin recording inline keyframes (as described above) from the playback, thereby restoring the ability for the player to replay or rewind into any part of the sequence to view again, move cameras, select speed or even take over the action to begin real-time replay of the game from a desired point in the saved playback sequence.

BRIEF DESCRIPTION OF THE DRAWINGS

These and other objects, features and advantages of the instant invention will be further understood from the following detailed description of the invention, when viewed in conjunction with the following drawings, in which:

FIGS. 6 and 7 show tables representing exemplary menu options for camera and speed changes available to the player during playback, in accordance with the instant invention;

FIGS. 8a–8h show selected frames of an exemplary skateboard game incorporating the instant invention; and FIGS. 9a and 9b show exemplary frames from the playback sequence of FIGS. 8a and 8h, respectively, with selected changes in the virtual camera made by the player of the game.

DETAILED DESCRIPTION OF THE
PRESENTLY PREFERRED EMBODIMENT(S)

Figure 1:
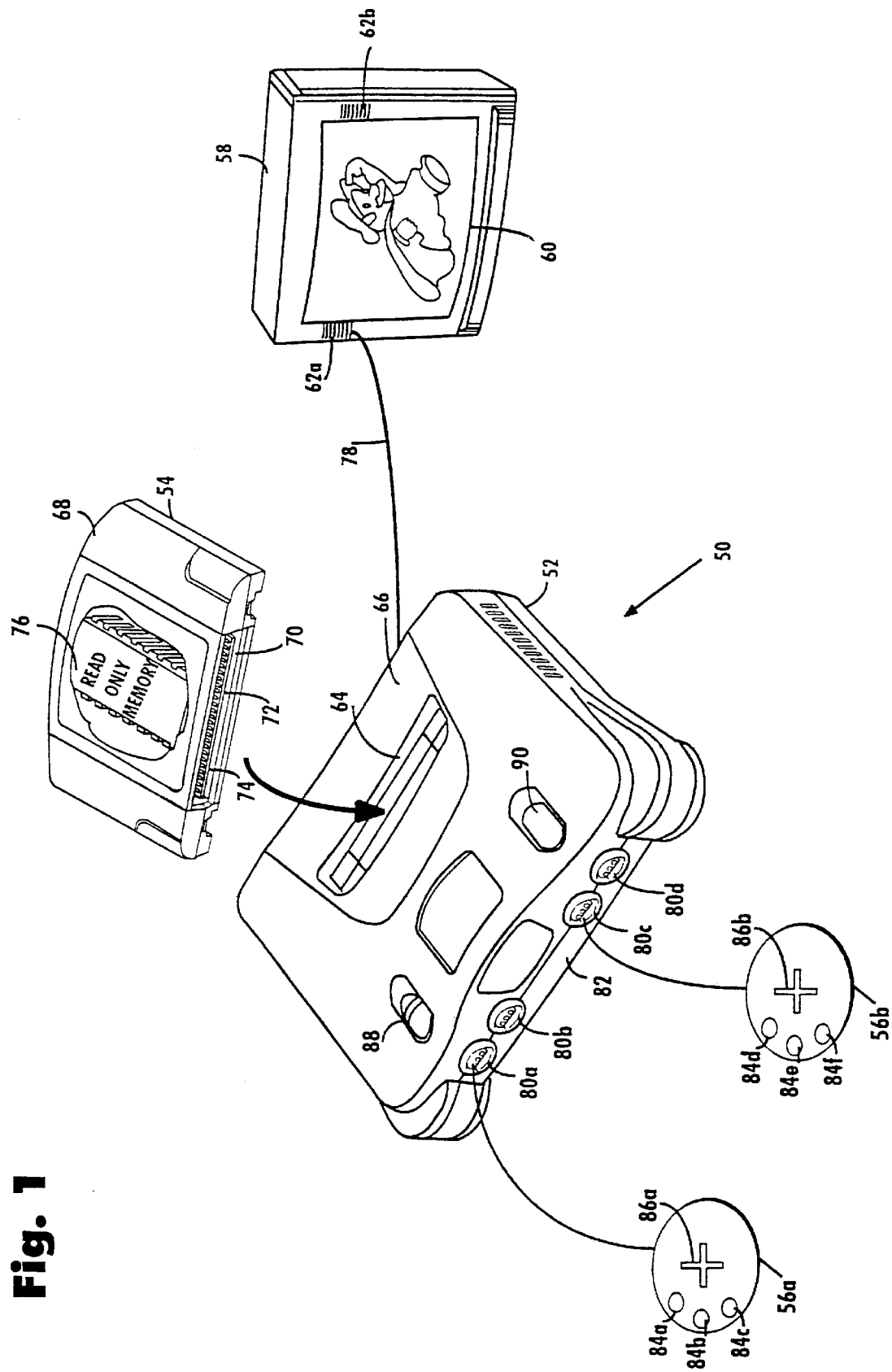
FIG. 1 shows an overall videogame system capable of playing games or other similar programs incorporating the instant invention.

FIG. 1 shows an example embodiment video game system 50 that can be used to execute videogames and the like incorporating the instant invention. Video game system 50 in this example includes a main unit 52, a video game storage device 54, and handheld controllers 56 (or other user input devices). In this example, main unit 52 connects to a conventional home color television set 58. Television set 58 preferably displays 3D video game images or similar images generated by the main unit 52 on its television screen 60 and reproduces stereo sound through its loud speakers 62a and 62b.

In this example, the video game storage device 54 is in the form of a replaceable memory cartridge insertable into a slot 64 on a top surface 66 of main unit 52. Video game storage device 54 can comprise, for example, a plastic housing 68 encasing a read only memory (ROM) chip 76. The read only memory 76 contains video game software in this example. When the video game storage device 54 is inserted into main unit slot 64, cartridge electrical contacts 74 mate with corresponding edge connector electrical contacts within the main unit. This action electrically connects the storage device's read only memory 76 to the electronics within main unit 52.

A read only memory (ROM) chip 76 stores software instructions and other information pertaining to a particular video game. The read only memory chip 76 in one storage device 54 may, for example, contain instructions and other information for a stunt game, such as a skate boarding game. The read only memory chip 76 in another storage device 54 may contain instructions and information to play a driving or car race game. The read only memory chip 76 of still another storage device 54 may contain instructions and information for playing an educational game. To play one game as opposed to another, the user of video game system 50 simply plugs the appropriate storage device 54 into main unit slot 64 thereby connecting the storage device's read only memory chip 76 (and any other circuitry the storage device may contain) to the main unit 52. This enables the main unit 52 to access the information contained within read only memory 76, which information controls the main unit to play the appropriate video game by displaying images and reproducing sound on color television set 58 as specified under control of the video game software in the read only memory.

To play a video game using video game system 50, the user first connects main unit 52 to his or her color television set 58 by hooking a cable 78 between the two. Main unit 52 produces both video signals and audio signals for controlling color television set 58. The video signals are what controls the images displayed on the television screen 60, and the audio signals are played back as sound through television loudspeakers 62a and 62b. Depending on the type of color television set 58, it may be necessary to use an additional unit called an RF modulator in line between main unit 52 and color television set 58. An RF modulator (not shown) converts the video and audio outputs of main unit 52 into a broadcast type television signal (e.g., on television channel 2 or 3) that can be received and processed using the television set's internal tuner.

The user also needs to connect main unit 52 to a power source. This power source may comprise a conventional AC adapter (not shown) that plugs into a standard home electrical wall socket and converts the house current into a lower DC voltage signal suitable for powering main unit 52.

The user may then connect hand controllers 56a, 56b to corresponding connectors 80 on main unit front panel 82. Controllers 56 may take a variety of forms. In this example, the controllers 56 shown each include various push buttons 84 and a directional switch or other control 86. The directional switch 88 can be used, for example, to specify the direction (up, down, down or right) that a character displayed on television screen 60 should move and/or to specify a point of view in a 3D world. Other possibilities include, for example, joysticks, mouse pointer controls and other conventional user input devices. In this example, up to four controllers 56 can be connected to main unit 52 to allow 4-player games to be played.

The user then selects a storage device 54 containing the video game he or she wants to play, and inserts that storage device into main unit slot 64 (thereby electrically connecting read only memory 76 to the main unit electronics via a printed circuit board 70 and associated edge contacts 74). The user may then operate a power switch 88 to turn on the video game system 50. This causes main unit 52 to begin playing the video game based on the software stored in read only memory 54. The player may operate controllers 86 to provide inputs to main unit 52 and thus affect the video game play. For example, depressing one of push buttons 84 may cause the game to start. As mentioned before, moving directional switches 86 can cause animated characters to move on the television screen 60 in different directions or can change the user's point of view in a 3D world. Depending upon the particular video game stored within the storage device 54, these various controls 84, 86 on the controller 56 can perform different functions at different times. If the user wants to restart game play, he or she can press a reset button 90.

Figure 2:
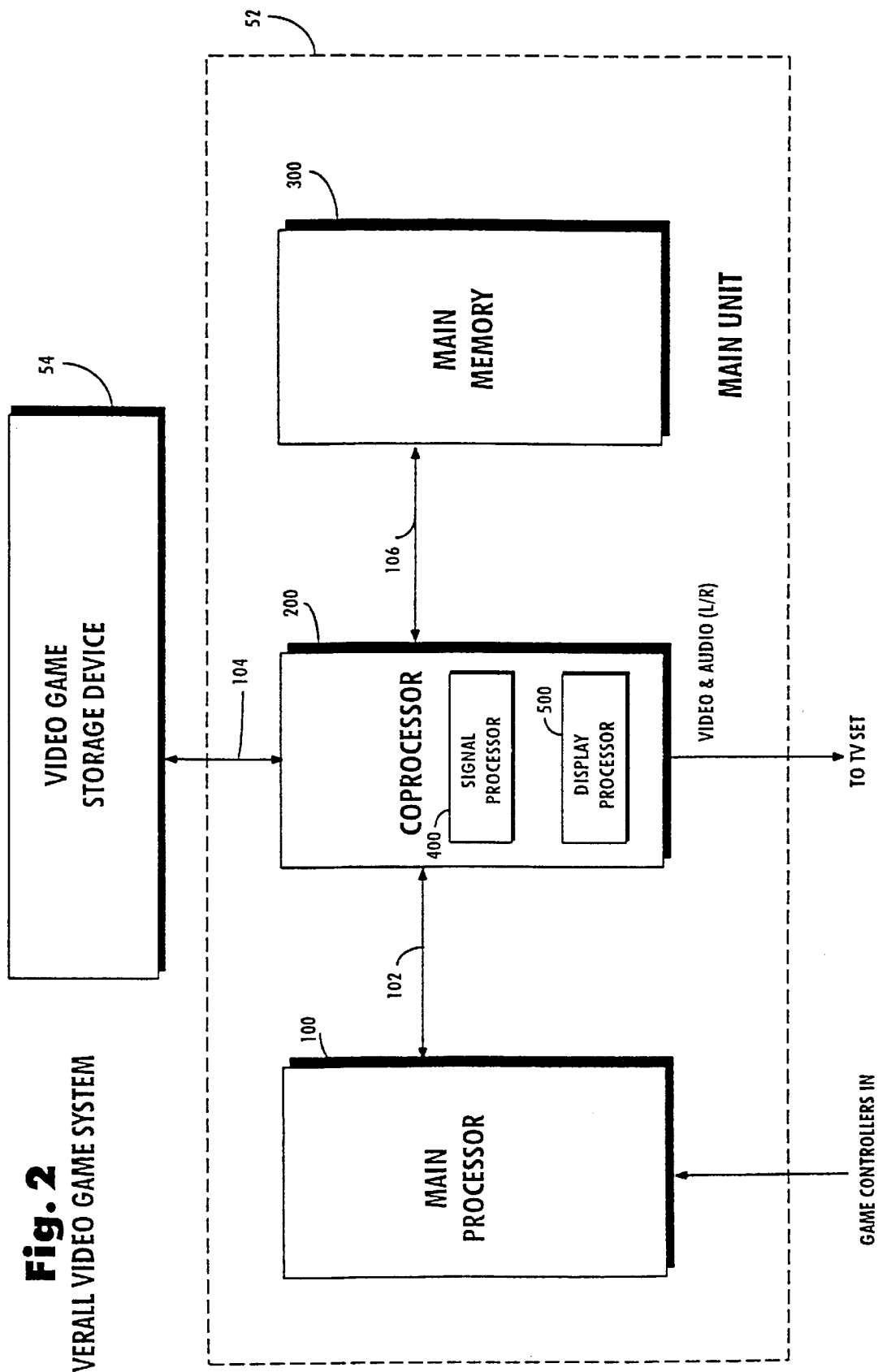
FIG. 2 shows an example of the principal component of the videogame system of FIG. 1.

FIG. 2 shows that the principal electronics within main unit 52 includes, for example, a main processor 100, a coprocessor 200, and main memory 300. Main processor 100 is a computer that runs the video game program provided by storage device 54 based on inputs provided by controllers 56. Coprocessor 200 generates images and sound based on instructions and commands it gets from main processor 100. Main memory 300 is a fast memory that stores the information main processor 100 and coprocessor 200 need to work, and is shared between the main processor and the coprocessor. In this example, all accesses to main memory 300 are through coprocessor 200.

In this example, the main processor 100 accesses the video game program through coprocessor 200 over a communication path 102 between the main processor 100 and the coprocessor 200. Main processor 100 can read from storage device 54 via another communication path 104 between the coprocessor and the video game storage device. The main processor 100 can copy the video game program from the video game storage device 54 into main memory 300 over path 106, and can then access the video game program in main memory 300 via coprocessor 200 and paths 102, 106.

Main processor 100 generates, from time to time, lists of commands that tell the coprocessor 200 what to do. Coprocessor 200 in this example preferably comprises a special purpose high performance application specific integrated circuit (ASIC) having an internal design that is optimized for rapidly processing 3-D graphics and digital audio. In response to commands provided by main processor 100 over path 102, coprocessor 200 generates video and audio for application to color television set 58. The coprocessor 200 uses graphics, audio and other data stored within main memory 300 and/or video game storage device 54 to generate images and sound.

FIG. 2 shows that coprocessor 200 in this example includes a signal processor 400 and a display processor 500. Signal processor 400 is an embedded programmable microcontroller that performs graphics geometry processing and audio digital signal processing under control of a microcode computer program supplied by video game storage device 54. Display processor 500 is a high speed state machine that renders graphics primitives, thereby creating images for display on television 58. The signal processor 400 and display processor 500 work independently, but the signal processor can supervise the display processor by sending graphics commands to it. Both signal processor 400 and display processor 500 can be controlled directly by main processor 100.

It is noted that the above-described game platform is only an exemplary platform and that the instant invention can be implemented on any suitable platform, including game consoles which are different from that described above, personal computers or any other information processing device or system, regardless of the type, and as long as the platform is capable of executing and displaying a video game or other similar interactive software programs. Inasmuch as the instant invention is directed mainly to software features of game programs and the like, and not to the specific consoles or systems on which such game programs are run, additional details regarding such known game systems, such as system 50, are not provided herein. In other words, the construction and operation of game consoles and other systems capable of running interactive game programs are generally well known. For example, the instant invention can be implemented on the known N64 game console offered by Nintendo®. Thus, in order not to obscure the instant invention with unnecessary details regarding known systems, further details regarding the game platform itself will not be provided herein, except where such further explanation will help to clarify the instant invention.

Figure 3:
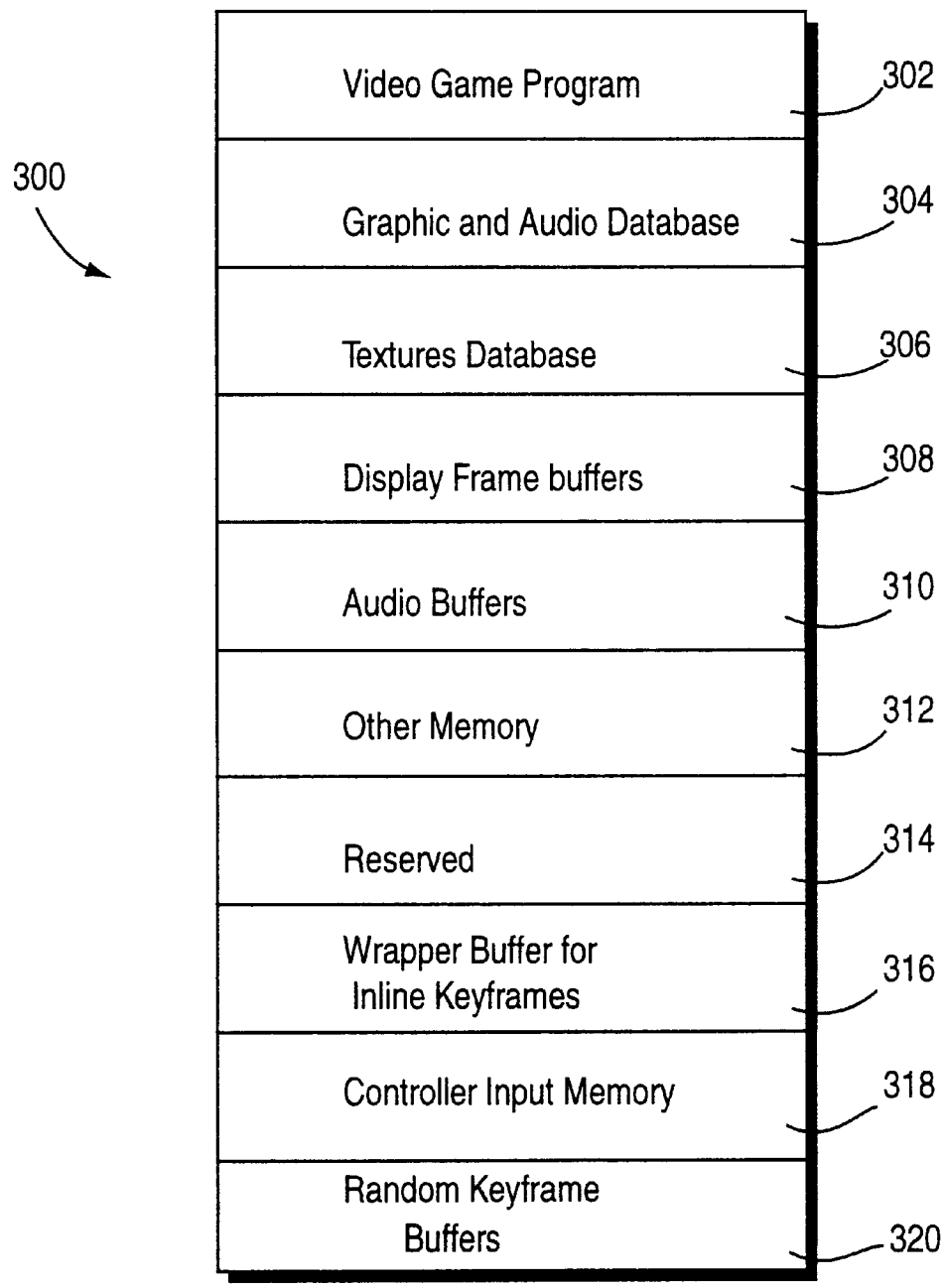
FIG. 3 shows an exemplary memory map in accordance with the instant invention.

FIG. 3 shows an exemplary memory map for main memory 300 in accordance with the instant invention. The main memory includes, for example, the video game program 302 (which is typically copied from the ROM cartridge 54 upon starting a game on the game console 52, graphics and audio data 304 and texture data 306 for use by the system, display frame buffers 308, audio buffers 310, other general purpose memory 312, and a reserved memory area 314. The above-listed items 302–314 in main memory 300 are generally standard and known items provided in typical main memories of video game systems. However, as will be explained in detail below, the wrapper buffer 316, controller input memory 318, and random keyframe buffers 320 are provided and used in accordance with instant invention to enable the real-time replay features of the invention to be realized. Thus, the following description will focus on operation of the software and its particular usage of the inline keyframe buffer 316, controller memory 318 and random keyframe buffers 320. It is noted, however, that the invention is not limited to the particular memory configuration shown in FIG. 3, but that any type or configuration of memory may be used, as long as the functionality described below is enabled thereby.

Figure 4:
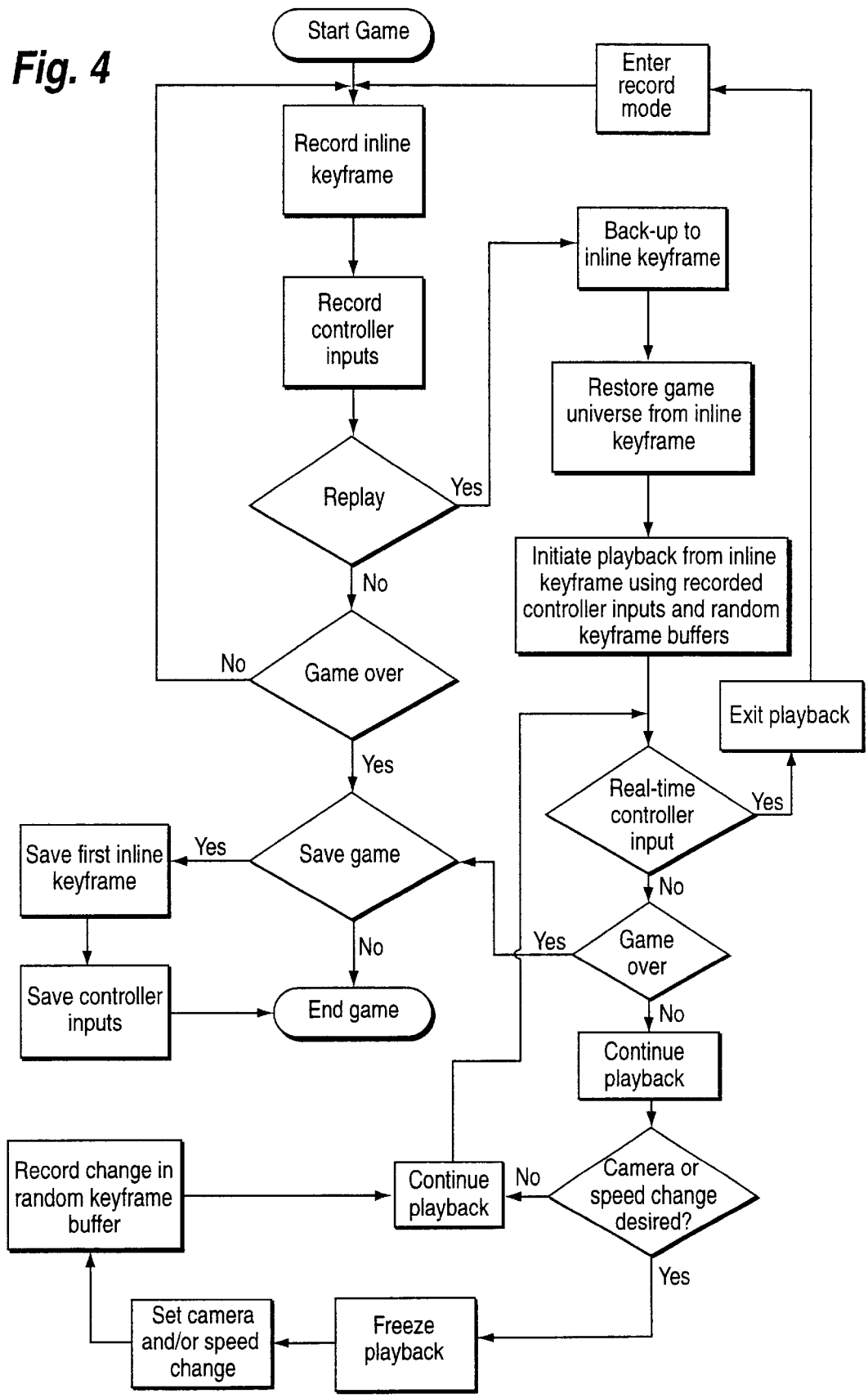
FIG. 4 shows a flow chart representing a preferred embodiment of the steps taken in accordance with the instant invention to enable creation, real-time replay and editing of a playback sequence.

FIG. 4 shows a general and exemplary flow chart of the overall operation of a video game incorporating the instant invention. The game may be any type of game which requires real-time interaction with the player (not show) through the use of a game controller or the like. It is noted, however, that the invention is particularly advantageous when used in connection with stunt games, such as skateboarding, snowboarding, skiing, and the like, as well as racing games, such as autoracing, motorcycle racing and the like.

Referring to FIG. 4, when the new game begins, a record mode is entered, wherein an inline keyframe is recorded at periodic intervals during the game. The inline keyframe is a "snap shot" of the game universe at a particular point in time, and includes all data necessary to begin the game from the point in game time where the inline keyframe was recorded. Controller information is also recorded every time the controller is read, such as twenty times per second. The inline keyframes are preferably stored in a wrapper buffer 316 which may be defined in a portion of the main memory available on the particular game console being used, such as main memory 300 shown in FIGS. 1 and 3. The wrapper buffer may be any suitable size and may depend on the amount of usable memory available on the particular game platform being used. The wrapper buffer is like a tape loop, in that after it becomes full with inline keyframes, the oldest inline keyframes are overwritten with the newest inline keyframes. In this way, the wrapper buffer can be used to continuously record inline keyframes during gameplay.

If the replay option is not selected by the player at anytime during the game, the game eventually ends like a normal game, at which time the player is preferably given the option of saving the game so that it can be viewed again at a later time. When saving the game, the game is preferably programmed such that only the first inline keyframe is saved, together with all of the controller inputs from the player during the game. In this way, the game can be retrieved from memory and played back simply by using the saved first inline keyframe to restore the entire game universe, and then using the stored controller inputs to control the game so as to identically simulate the previously saved game. In other words, when a game is saved, the entire game is not saved as an actual video, but instead, the particular game is re-shown to the player (or others) using only the stored first inline keyframe and the stored controller inputs. This enables the entire game to be effectively saved and reshown using much less memory than would be required to actual save the game as a video image.

If, on the other hand, the player selects the replay option during the game then the real-time replay feature of the instant invention is invoked. More particularly, the game is programmed so that, upon selection of a predetermined controller input, such as the L button on an N64 controller, the game enters a replay or playback mode. Upon entry of playback mode, the wrapper buffer is "rewound" to the nearest saved inline keyframe corresponding to the back-up location desired by the player. For example, the game may be programmed to cause the game to back-up or rewind a set distance in game time for each time the replay button is pressed, such as three seconds for each press. The game may also be programmed to cause the game to rewind all the way to the beginning of the game if the replay button (or another designated button or controller function) is continuously pressed for a set period of time, such as for one-half of a second.

Once the nearest inline keyframe is located, the entire game universe is restored based on that keyframe, so that the state of the game identically corresponds to the point in game time when that particular keyframe was recorded. Once the game is restored, the game begins to playback the game from the rewound point using the saved controller input so that the playback simulates what previously occurred in the game prior to the initiation of the replay option. This enables the player to watch the previously played portion of the game in real-time (i.e. prior to the game actually being completed). Once the playback sequence is finished, the user can then continue the game in real-time to completion, with the option of again playing back any desired portion of the game using the replay button at anytime during the game.

In accordance with another feature of the instant invention, the player can, at anytime during a playing back of a previously played game sequence, take-over control of the game (i.e. enter real-time play of the game) using the game controller, thereby enabling the player to change the result of the game or retry portions of the game in real-time. In order to achieve this functionality, the actual controller inputs are processed independently of the saved controller inputs, so that upon detection of an actual controller input, such as the z button on an N64 controller, the program exits playback mode and enters real-time play or record mode. This enables the player to take-over the action from the playback sequence to again begin actual play of the game using the actual controller from a location in the playback sequence corresponding to the location where the controller input is detected by the program. Upon entering real-time play, the recording of the inline keyframes and the controller information is again performed, as explained above, in order to again provide the player with the option of backing-up and replaying desired portions of the game in real-time. If the player does select the replay option, the process described above is repeated, i.e. the game is back-up to the nearest keyframe, the game is restored from the keyframe, and playback is initiated from the keyframe using stored controller inputs. The user then has the option of again taking-over the action (and entering record mode) at anytime during the playback, as explained above. Once the game is finally completed, the player has the option of saving the game in the manner described above.

In accordance with another aspect of the instant invention, the game is preferably programmed to enable the player to make real-time changes to the virtual camera(s) or viewpoints used during the game to show the game action. For example, during any playback sequence, the player can select a predefined controller button, such as the R button or C buttons on an N64 controller, to freeze the playback sequence and enable the player to add and/or change cameras and/or the change the speed of the playback, thereby enhancing and/or changing the viewing of the playback sequence. In an alternative embodiment, the screen overlay or status bar can be shown upon entering the replay mode, e.g. upon pressing the L button on an N64 controller. Once the action is frozen, the status bar is preferably shown on the screen which displays the buttons and analog functions available for the playback sequence. For convenience of the player, this display is preferably provided in a form which at least generally corresponds to the layout of the particular controller being used. The overlay information provides a menu which can be used by the player to select cameras feature and/or the speed (fast/slow motion) for the playback sequence, thereby enabling the player to customize the playback sequence in real-time.

FIGS. 6 and 7 show the C button settings and analog stick modes for an exemplary embodiment of the invention designed for use with the N64controller (not shown). In this N64 embodiment of the invention, the L button is used to initiate the replay feature. Once the L button is pressed, the game status bar is switched to display the button and analog functions shown in FIGS. 6 and 7. The analog left/right control element on the N64 controller is operable to slow down and speed up the playback sequence. Preferably, any camera change made returns the replay mode to a normal speed. The R button is preferably used to stop and start the playback sequence. The B button enables the player to back up through the menus provided by the tables of FIGS. 6 and 7, while keeping any changes thereto. The Z button enables the player to take over the playback sequence and enter actual play mode from a desired point in the playback sequence. The D pad (cross-switch) on the N64 controller enables the player to save a replay (Up/right) or replay a saved sequence (Down/left). As can be seen from FIGS. 6 and 7, the game program preferably enables the player to position a camera at any point in the game space for viewing the playback sequence, to change the camera behavior (follow, dolly, static, etc.), and to change the camera characteristics (zoom, distance, etc.), as well as the actual playback speed, which is coordinated with the changes made to the camera. In this way, the player can customize and watch the playback sequence in real-time.

Referring again to FIG. 4, and more particularly, to the bottom portion thereof, any changes in the camera or speed as explained above, are preferably recorded in a random keyframe buffer, such as buffer 320 shown in FIG. 3, together with information that tells the game program on what frame the change(s) is to take effect. In this way, the size of the standard playback keyframes can be significantly smaller, thereby enabling longer sequences to be recorded. Thus, during playback, the random keyframe buffers are checked for changes to be incorporated during the playback. For example, if the player places a panning zoom camera and slows the speed down (slow motion), these changes will take effect the next time that the sequence is played back and will become a permanent part of the sequence until changed again (if desired). In this manner, the player can, for example, "check-out" a cool trick in slow motion (and over and over if desired) from a cool perspective that enhanced the visual appearance of the trick, thereby increasing the enjoyment of the game.

Figure 5:
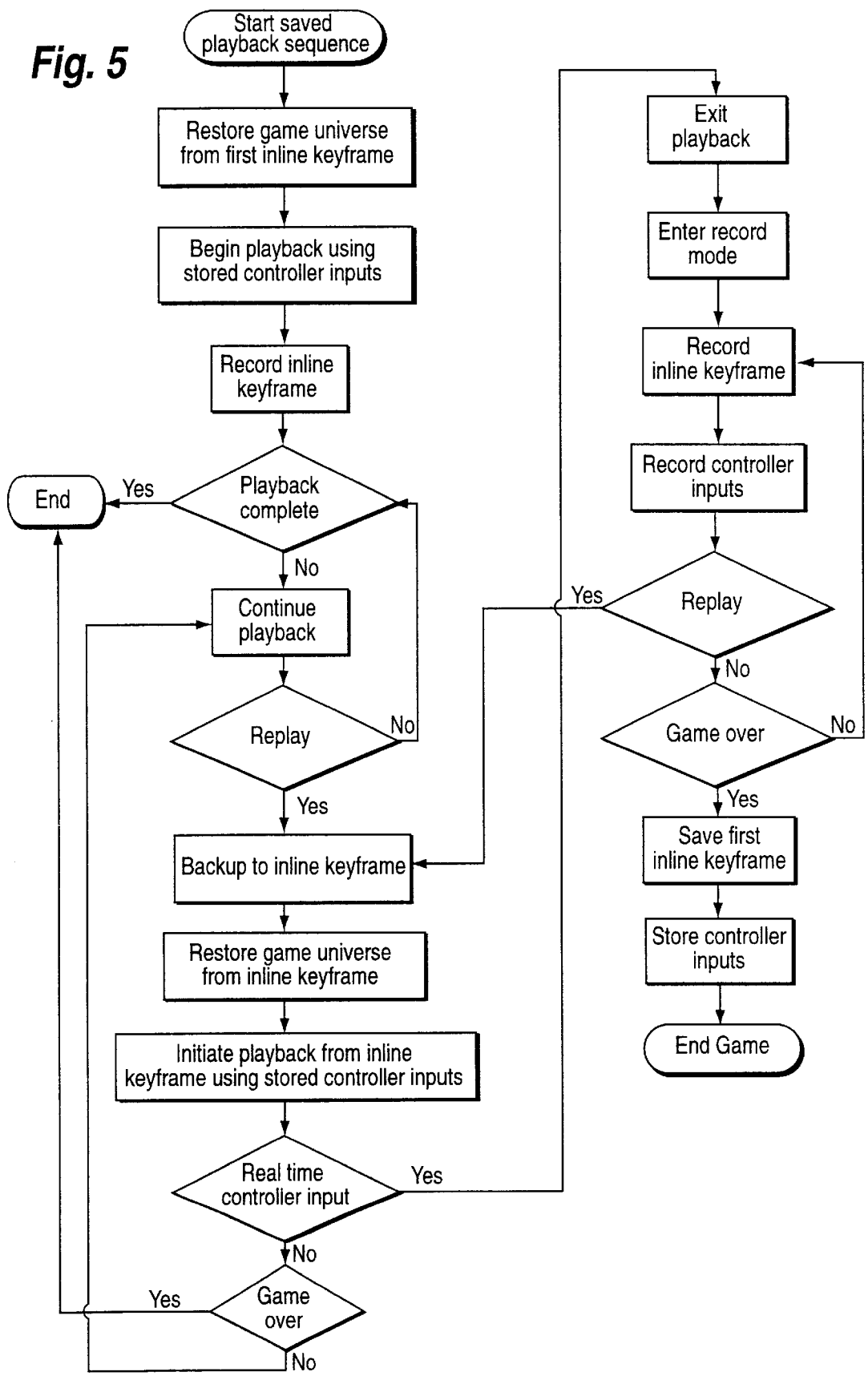
FIG. 5 shows a flow chart representing a preferred embodiment of the steps taken in accordance with the instant invention to playback a saved playback sequence, as well to enable real-time replay and editing of the saved gameplay sequence.

As explained above, a finished game can be saved for playback at a future time. For example, the game can be saved to a non-volatile memory, such as a memory provided in an expansion pack for an N64 console. FIG. 5 shows a preferred embodiment of the overall operation of the game software during playback of a saved game sequence. Once a saved game (playback sequence) is selected by the player for playback, the program restores the game universe from the first inline keyframe, which was previously stored at the end of the game, and then begins playback from the first inline keyframe using the previously stored controller inputs. In addition, when the playback sequence is loaded from non-volatile memory, a flag is set in order to tell the software that inline keyframes (as described above) should be rebuilt during playback, in order to restore the ability for the player to selectively replay or rewind into any point in the playback sequence (as described above with respect to playing of an actual game). If the player does not select the replay option during playback of the saved sequence, the game simply shows a simulation (video) of the previously played game for enjoyment by the player and/or others. On the other hand, if the player selects the replay option during replay of the saved game, the game is backed up to the nearest inline keyframe, the game universe is restored based on the inline keyframe and playback is initiated from the inline keyframe using the stored controller inputs.

As explained above, the player has the option during playback of a saved sequence to take-over the playback and begin real-time (actual) playing of the game at any point in the saved playback sequence. If the player chooses not to exercise this take-over option, and lets the playback finish, the playback simply ends. On the other hand, if the player decides to take-over the playback (by, for example, pressing the Z button in the N64 embodiment described above), the playback mode is exited and the record mode is entered (see right side of FIG. 5). Upon entry of the record mode, the inline keyframes and real controller inputs are recorded, as explained above with respect to a new game. The game then provides the player with substantially the same options and functionality as described above with respect to the playing of a new game (see FIG. 4).

It is noted that while FIG. 5 does not show the camera and speed change capability of FIG. 4, this same capability is preferably provided in connection with a saved playback sequence in the same manner described with respect to FIG. 4. In other words, the player can change cameras and/or speed of the playback at any place in the playback, regardless of whether the player starts with a saved game (FIG. 4) or a new game (FIG. 5), and regardless of whether the player takes over the action during playback of a saved sequence or a new game sequence. For clarity only, these camera and speed features have been left off the flow chart of FIG. 5.

The main features of the invention will now be further described with respect to an exemplary skateboard embodiment. In this exemplary embodiment, the instant invention has been incorporated into a known type of skateboarding game, wherein the player controls a skateboarding character through a skateboarding course while attempting to perform various tricks, moves, stunts and/or the like.

Figure 8A:
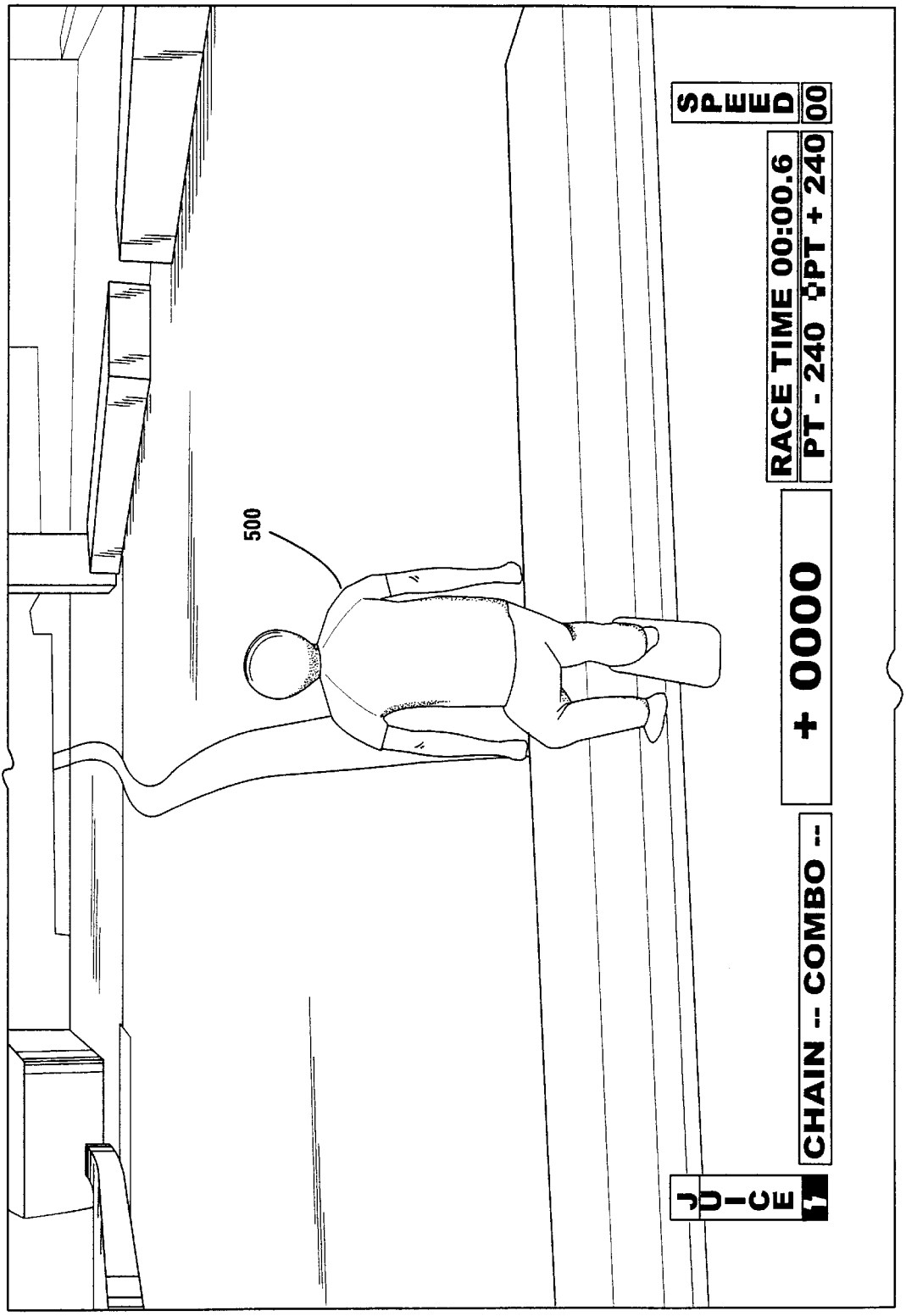
Figure 8B:
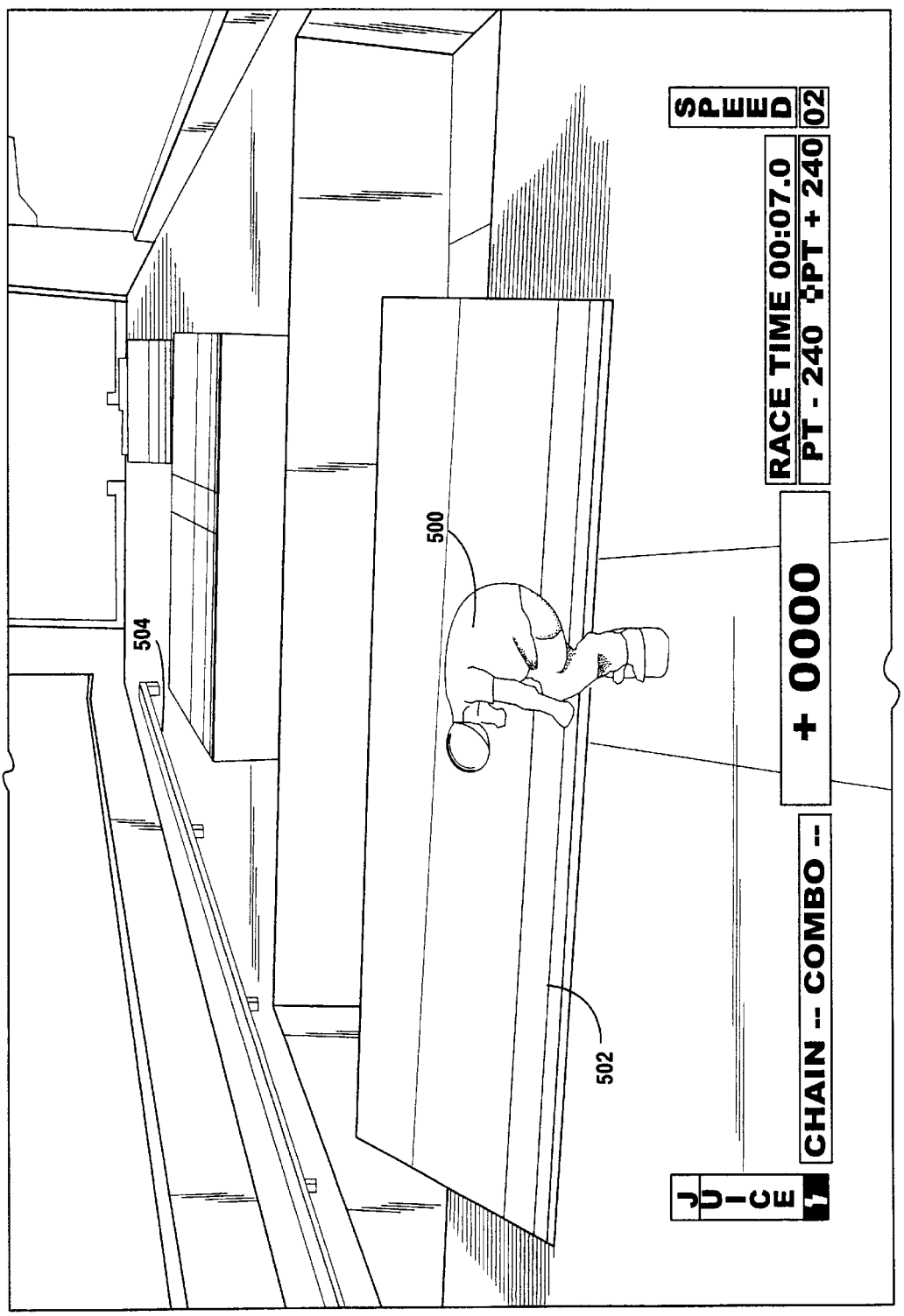
Figure 8C:
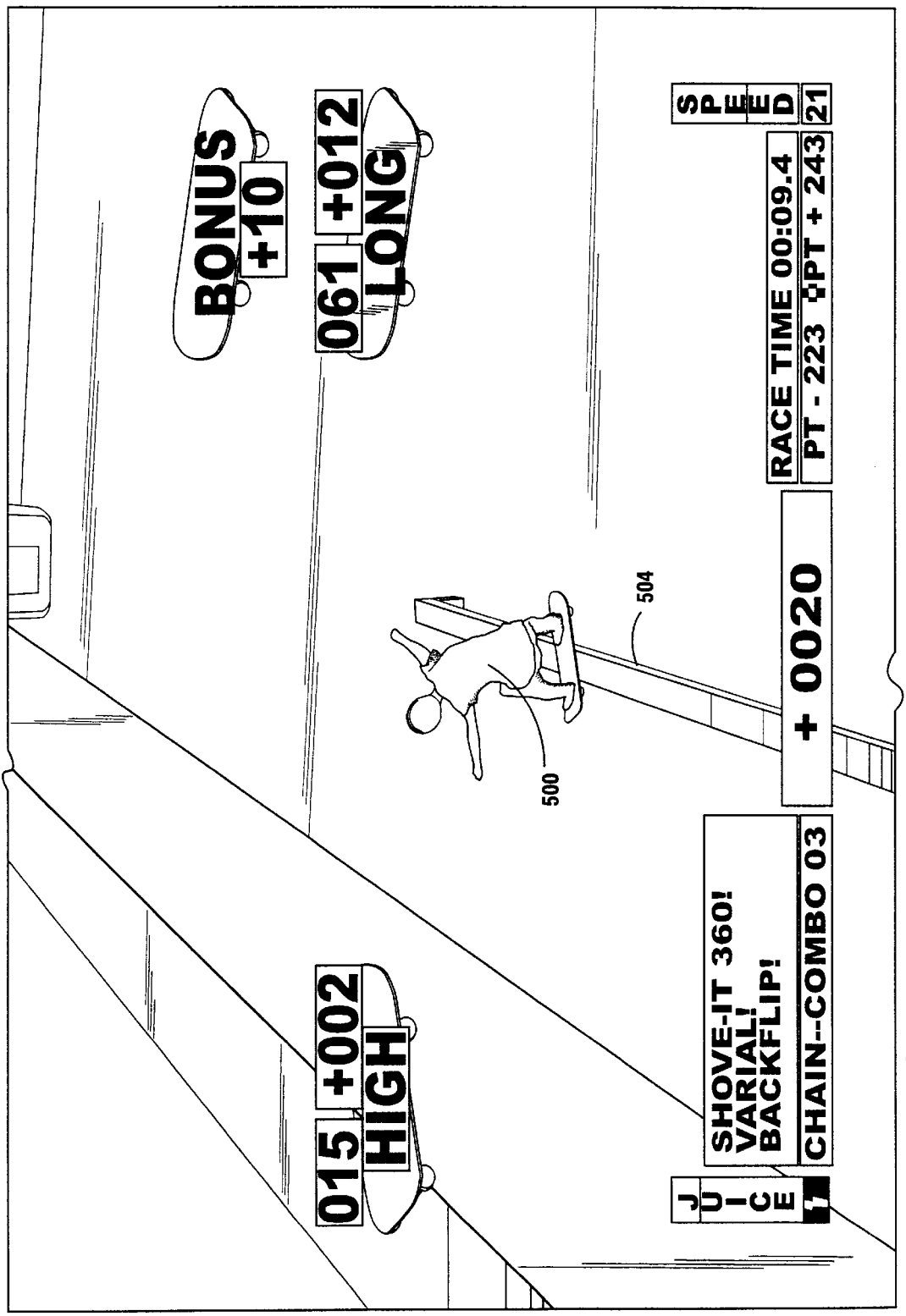
Figure 8D:
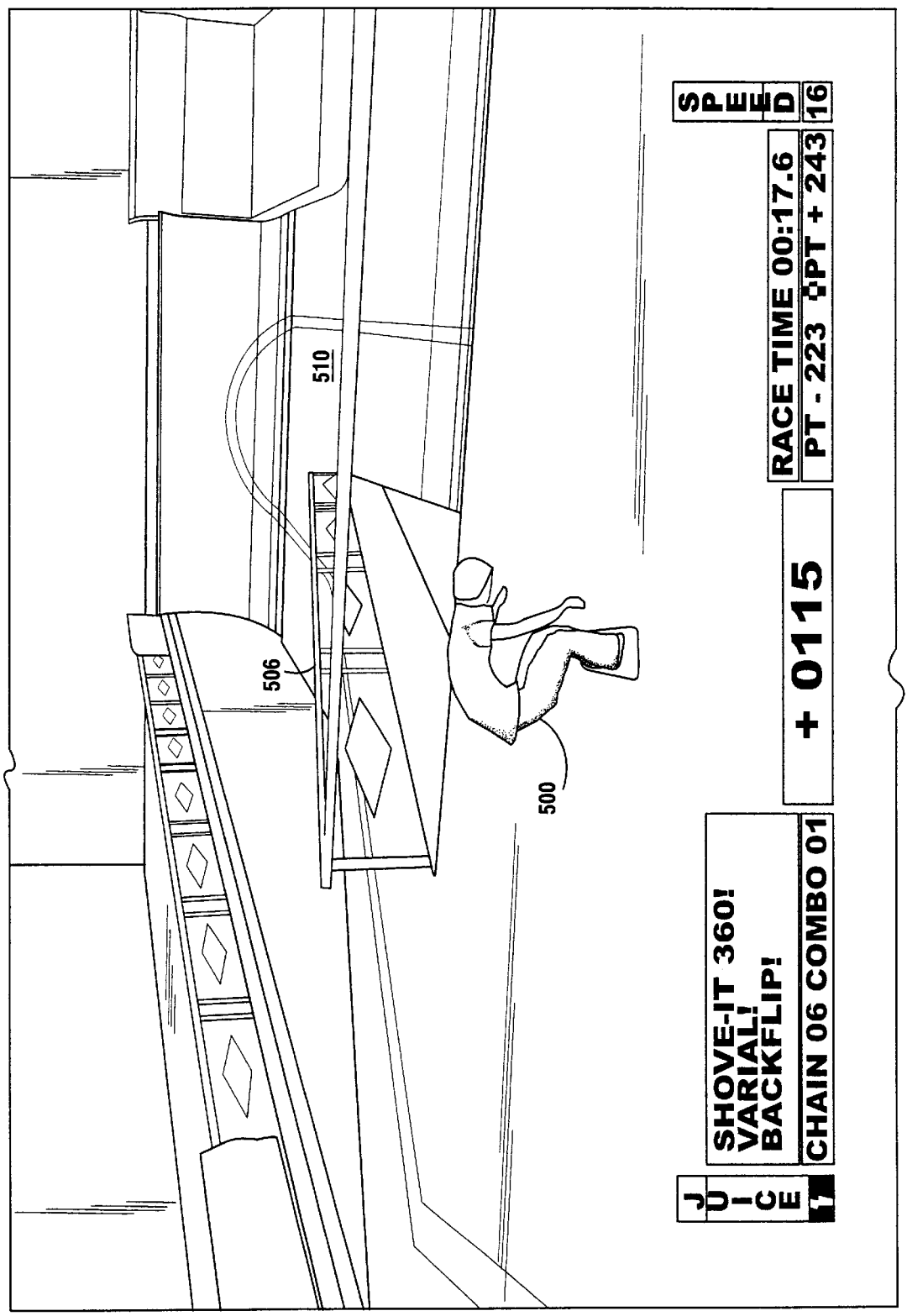
Figure 8E:
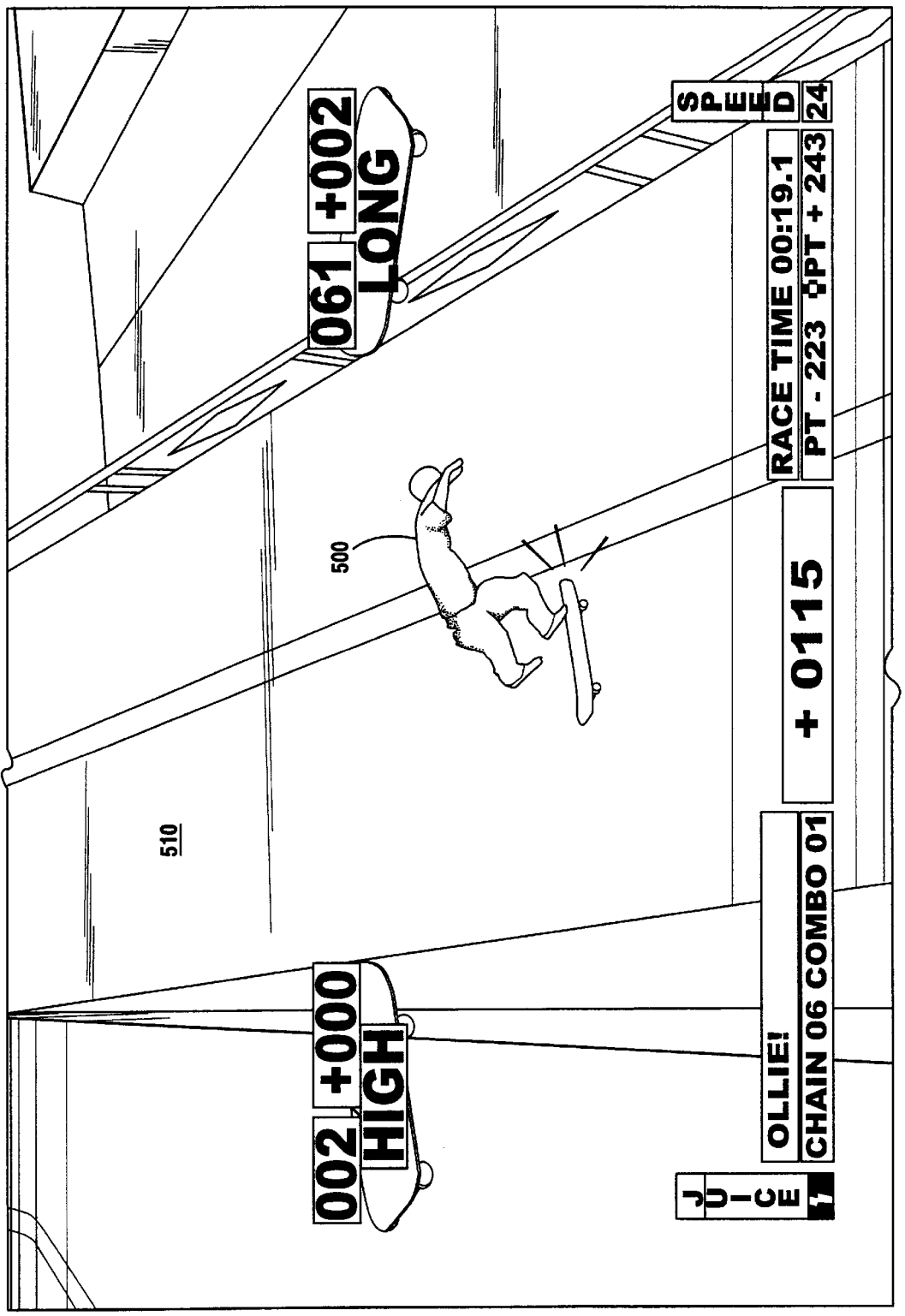
Figure 8G:
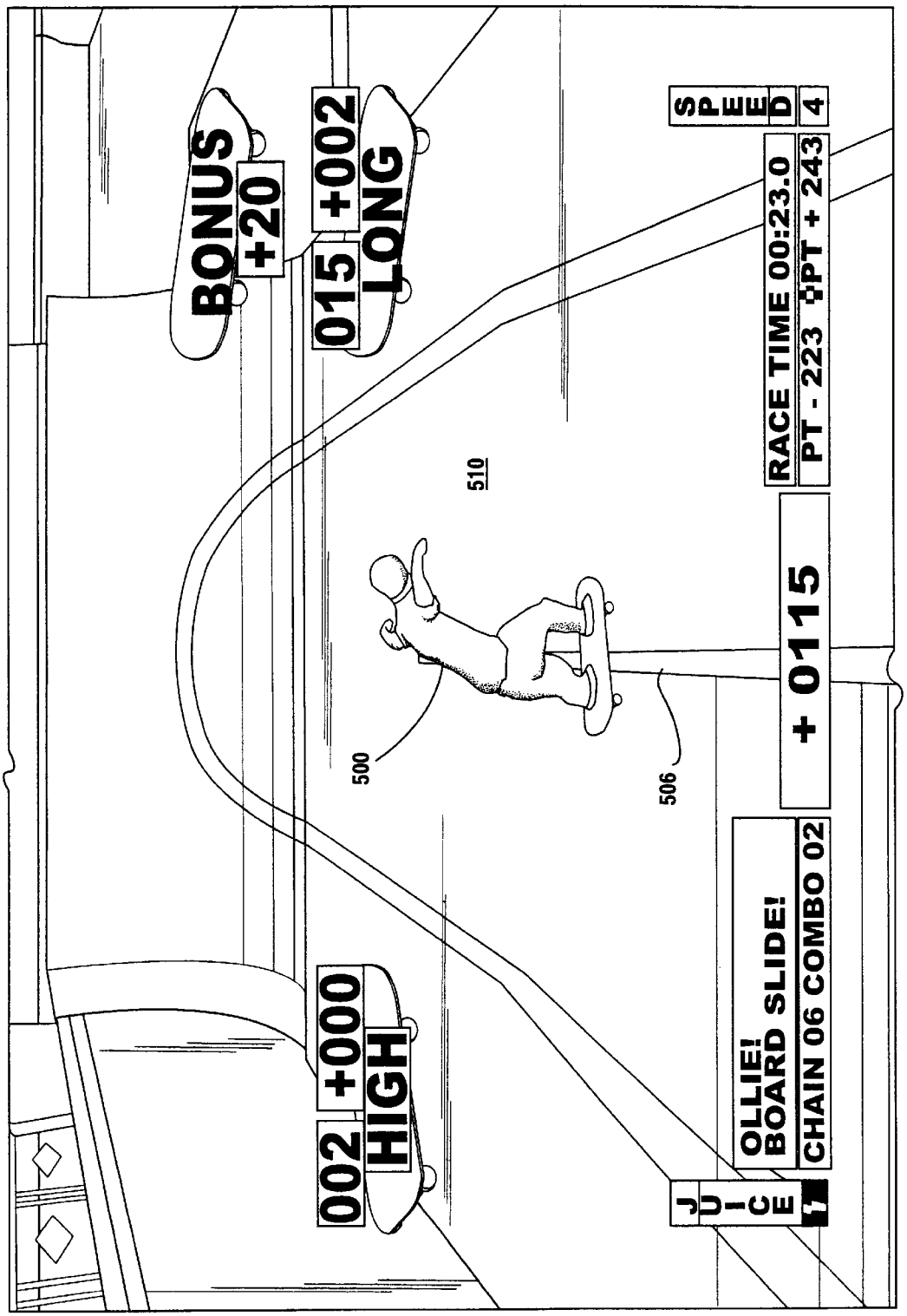
Figure 8H:
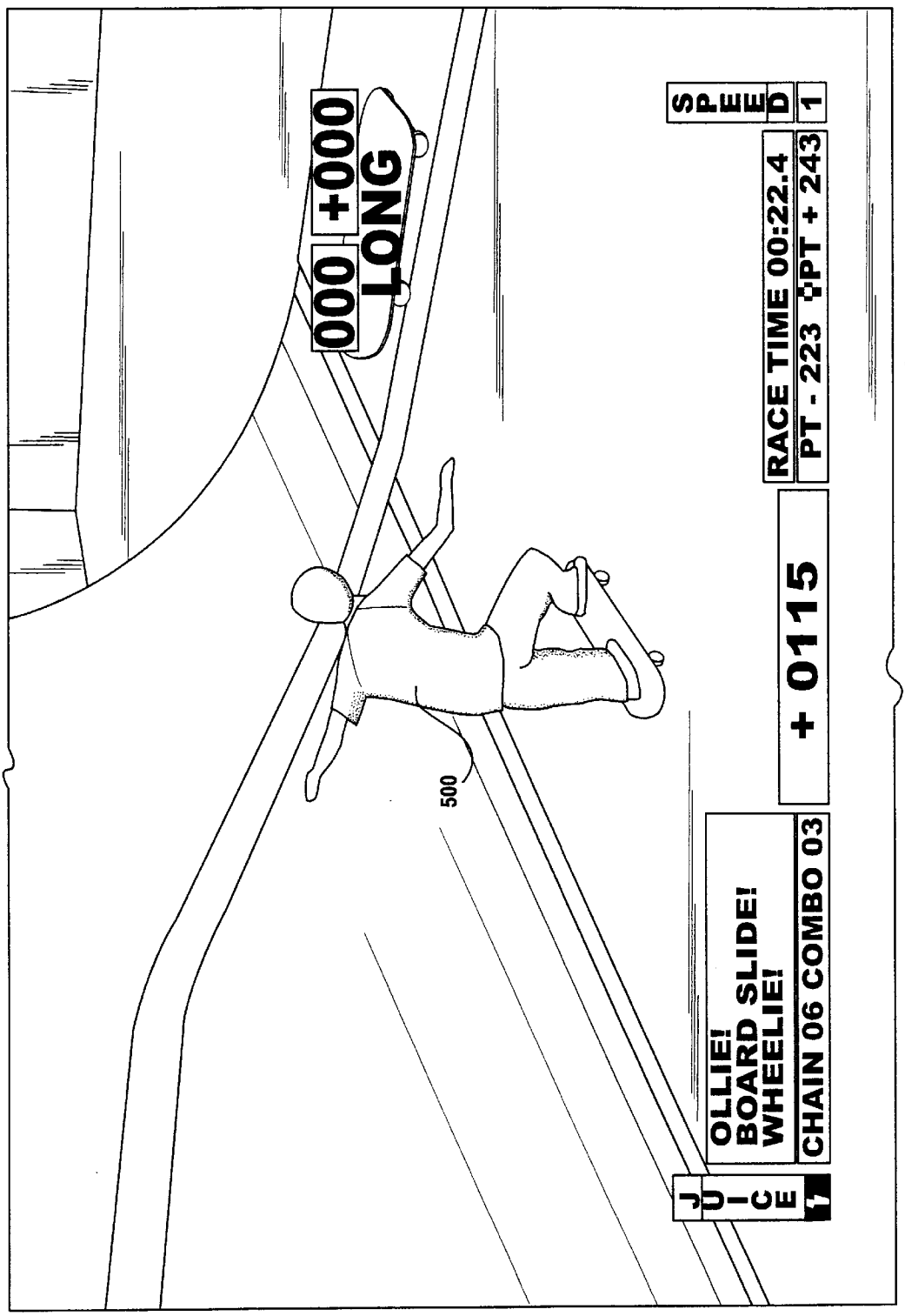

Referring now to FIG. 8a, there is shown a first frame of a skateboard game, wherein the skateboard character 500 is about to begin the game course. This first frame may be used as the first inline keyframe as described above for the purpose of replay and/or saving a played game. FIG. 8b shows the character 500 at a position where he is about to attempt a trick using ramp 502. More particularly, the character 500 plans to attempt a jump from ramp 502 and to land and slide on rail 504. FIG. 8c shows the character 500 successfully performing the planned trick, by landing and sliding on the rail 504. FIG. 8d shows the character 500 planning to attempt another trick by jumping onto the downwardly angled rail 506 and sliding along same to the landing area 510. FIG. 8e shows the character 500 missing the trick by failing to land on the rail 506 and landing instead directly on the landing area 510 below the rail 506. This missed trick constitutes and adverse event for the player. Thus, in accordance with the instant invention, the player decides to hit the replay button once, thereby causing the game to backup or rewind three seconds in game time (i.e. from game time 0:12 back to game time 0:09, thereby placing the character back in the same position he was prior to missing the trick, as shown in FIG. 8f. In other words, in this embodiment of the invention, hitting the replay button once causes the game to backup or rewind three seconds in game time (note "game time" clock in FIGS. 8a–8h). This is done using the nearest recorded inline keyframe as explained above. This enables the player to have the character 500 back at the identical position shown in FIG. 8d, so that the trick can be attempted again, thereby providing a real-time replay feature for the player. As shown in 8d, the player is able to make the character 500 successfully perform the trick by landing the character on the rail 506 and sliding down same to the landing area 510. FIG. 8h shows an exemplary frame constituting the end of the game. Of course, FIGS. 8a–8g only show selected frames rather than the entire video game, in which normally the game would typically last for at least one minute or more and provide the player with numerous opportunities to attempt tricks. However, FIGS. 8a–8h demonstrate how the player can replay and attempt to correct errors made or overcome other undesirable events during the game. The player can preferably replay any section of the course as many times as he chooses in order to achieve the desired result at each section of the course. Thus, even though the actual game time is only one minute in this example, the actual viewing time can be much longer as a result of the available replay option that can be used as many times as the player desires during the game.

As explained above, this replay feature is enabled in this embodiment by the recording of inline keyframes and controller information. Thus, each time the player replays a section of the course, only the last replay is maintained for use with the next replay, if any. Thus, upon replaying the entire game shown in FIGS. 8a–8h, the frame of FIG. 8e will no longer be included as part of the game, due to the fact that this portion of the game was replayed with a different result as shown in FIG. 8g. It is noted that, in this example, the player took over the game action at the frame shown in FIG. 8f, thereby enabling the player to correct the previously missed trick, as shown in FIG. 8e. Alternatively, the player could have simply let the replay playback with the stored controller inputs, thereby simply watching the same result as shown in FIG. 8e without intervention. If no intervention or take over had occurred by the player during the playback, then the resulting video or playback sequence would have still included the missed trick shown in FIG. 8e and not that of FIG. 8g.

Figure 9B:
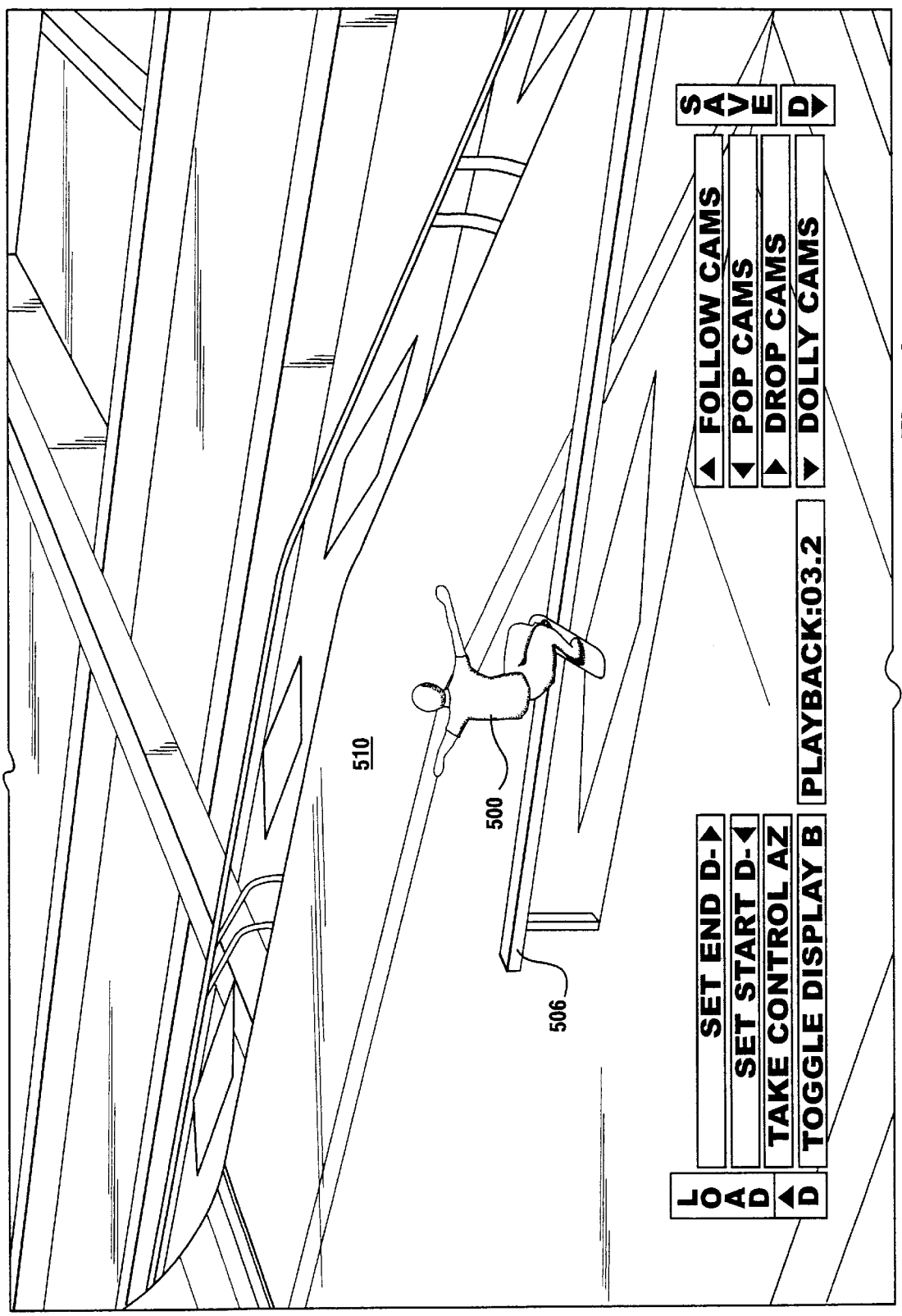

FIGS. 9a and 9b demonstrate the camera changing feature of the instant invention, as described above. Specifically, during a playback of the first successful trick shown in FIG. 8c, the player has frozen the action and changed the camera placement and camera angle so that the playback of this same sequence is from a different viewing perspective, as shown in FIG. 9a. The player has also changed the viewing perspective of the second successful trick, as now shown in FIG. 9b. As explained above, the player may also selectively change the speed of the playback. The camera changes and speed changes are then stored in the random keyframe buffer 320, together with information as to what frame the changes take place, so that the next playback will include these changes. One advantage of the camera aspect of the instant invention, is that it provides complete flexibility for camera locations and features, as well as coordinates the selected camera locations and features with the playback speed which is also set by the player. At the end of the game the player is preferably given the option to save the game to a non-volatile memory for playback at a future time, as explained above. The saved game is then available for playback as described above with respect to FIG. 5.

As is apparent from the above-description, the wrapper buffer 316 is always either being used for recording or for playback, depending on what mode the game is currently in. Preferably, the recording is based on the internal logic rate, and not based on the speed of either the internal processor or the video refresh rate, both of which can vary from console to console. This enables playback at any speed, not necessarily a multiple of the console speed, without loss of synchronization. Thus, the instant invention enables the player to exit playback mode directly into recording mode without disturbing the previous playback sequence, thereby facilitating the creation of long, seamless sequences. As a result, one advantage of the instant invention is that it enables a player to create "video" of a "perfect run", by trying tricks or moves over and over again until they are performed in the desired manner. The player can then store the "perfect run" for himself and others to enjoy at a future time. In addition, the saved video can be taken over during playback by the player so that a new (and possibly further improved) game sequence can be generated from any point in the saved video.

While the preferred forms and embodiments of the invention have been illustrated and described, various changes and modifications may be made to the invention without deviating from the true spirit and scope of the invention, as will be understood by one skilled in the art. It is intended by the appended claims to cover all such modifications and variations, and this claimed invention is not meant to be limited by the specific exemplary embodiments described herein.

We claim:

1. A method of providing real-time replay during gameplay in an interactive video game system, comprising:

starting real-time gameplay;

recording an inline keyframe at predetermined time intervals during gameplay;

recording controller input from a user during gameplay;

upon selection by the user of a predetemined controller input prior to the end of a game:

backing-up the gameplay a set period of gameplay time from the current gameplay condition to a previous gameplay condition;

using a recorded inline keyframe generally corresponding to the previous gameplay condition and the recorded controller inputs to generate and display at least a partial real-time replay of the game from the previous gameplay condition to the current gameplay condition; and enabling the user to take over the replay to begin real-time gameplay at any time during the replay and from a point in the replay where the user has taken over the replay by supplying controller input, wherein the recordings of inline keyframes and recording of controller inputs is performed based on an internal logic rate of the video game system;

and further including enabling the replay to be frozen at any time during the replay and allowing the user to change at least one of camera characteristic and playback speed for the replay while the replay is frozen, and further including recording any changes to the camera characteristic or playback speed in an array of random keyframe buffers together with information that determines on which frame of the replay the recorded changes are to take effect.

2. The method of claim 1, further including continuing real-time gameplay upon completion of the replay.

3. The method of claim 1, wherein backing-up the gameplay a set period of time includes backing-up the gameplay approximately three seconds of gameplay time.

4. The method of claim 1, further including monitoring during the entire gameplay for the predetermined controller input from the user in order to enable the user to select a real-time replay at any point during gameplay.

5. The method of claim 1, further including using a wrapper buffer to store the recorded inline keyframes.

6. The method of claim 1, further including generating and displaying an entire replay of the game from the previous gameplay condition to the current gameplay condition if the user does not provide any controller input during the replay.

7. A method of providing real-time replay during gameplay in an interactive video game system, comprising:

starting real-time gameplay;

recording an inline keyframe at predetermined time intervals during gameplay;

recording controller input from a user during gameplay;

upon selection by the user of a predetermined controller input prior to the end of a game:

backing-up the gameplay a set period of gameplay time from the current gameplay condition to a previous gameplay condition;

using a recorded inline keyframe generally corresponding to the previous gameplay condition and the recorded controller inputs to begin a real-time replay of the game from the previous gameplay condition;

completing a replay of the game from the previous gameplay condition to the current gameplay condition if the player does not provide any controller input during the replay; and enabling the user to take over the replay to begin real-time gameplay at any time during the replay and from a point in the replay where the user has taken over the replay by supplying controller input;

wherein the recordings of inline keyframes and recording of controller inputs is performed based on an internal logic rate of the video game system and further including enabling the replay to be frozen at any time during the replay and allowing the user to change at least one of camera characteristic and playback speed for the replay while the replay is frozen, and further including recording any changes to the camera characteristic or playback speed in an array of random keyframe buffers together with information that determines on which frame of the replay the recorded changes are to take effect.

8. The method of claim 7, further including continuing real-time gameplay upon completion of the replay.

9. The method of claim 7, wherein backing-up the gameplay a set period of time includes backing-up the gameplay approximately three seconds of gameplay time.

10. The method of claim 7, further including monitoring during the entire gameplay for the predetermined controller input from the user in order to enable the user to select a real-time replay at any point during gameplay.

11. The method of claim 7, further including using a wrapper buffer to store the recorded inline keyframes.

* * * * *